(12) United States Patent
Larson et al.

(10) Patent No.: US 10,780,895 B2
(45) Date of Patent: Sep. 22, 2020

(54) THROTTLE CONTROL GRAPHICAL USER INTERFACE FOR A WORK VEHICLE

(71) Applicant: CNH Industrial America LLC, New Holland, PA (US)

(72) Inventors: Erik Andrew Larson, Fargo, ND (US); Paul Eugene Wibbels, West Fargo, ND (US)

(73) Assignee: CNH Industrial America LLC, New Holland, PA (US)

( * ) Notice: Subject to any disclaimer, the term of this patent is extended or adjusted under 35 U.S.C. 154(b) by 204 days.

(21) Appl. No.: 15/991,519

(22) Filed: May 29, 2018

(65) Prior Publication Data

US 2019/0367045 A1    Dec. 5, 2019

(51) Int. Cl.

| | |
|---|---|
| *B60W 50/08* | (2020.01) |
| *G06F 3/0481* | (2013.01) |
| *F02D 11/10* | (2006.01) |
| *B60W 10/06* | (2006.01) |
| *B60W 10/11* | (2012.01) |
| *G06F 3/0484* | (2013.01) |

(52) U.S. Cl.
CPC .......... *B60W 50/085* (2013.01); *B60W 10/06* (2013.01); *B60W 10/11* (2013.01); *F02D 11/105* (2013.01); *G06F 3/04817* (2013.01); *G06F 3/04847* (2013.01)

(58) Field of Classification Search
None
See application file for complete search history.

(56) References Cited

U.S. PATENT DOCUMENTS

| | | | | |
|---|---|---|---|---|
| 2006/0287778 | A1* | 12/2006 | Oltheten | G01D 7/002 701/1 |
| 2011/0001636 | A1* | 1/2011 | Hedrick | B60K 37/02 340/971 |
| 2013/0096895 | A1* | 4/2013 | Willard | B60W 50/085 703/8 |
| 2016/0252144 | A1* | 9/2016 | Kajino | B60R 25/04 701/67 |
| 2017/0045009 | A1* | 2/2017 | Ueda | F02D 41/04 |

OTHER PUBLICATIONS

Claas, "Arion," http://www.claas.co.uk/blueprint/servlet/blob/628276/b1af1284048be9583cbf6ba451caa7fd/248702-dataRaw.pdf, retrieved Mar. 30, 2017.

* cited by examiner

*Primary Examiner* — Justin Holmes
(74) *Attorney, Agent, or Firm* — Rickard K. DeMille; Rebecca L. Henkel

(57) ABSTRACT

A control system for a work vehicle system includes a controller that instructs a graphical user interface to present a first indication having a member extending between a first end positioned below a second end, wherein the second end is positioned above the first end, and present a second indication indicative of an engine speed range, such that the second indication includes a lower engine speed value and an upper engine speed value. In addition, the controller instructs the graphical user interface to selectively present a first symbol at the first end and a second symbol at the second end to indicate that an engine speed varies between the lower engine speed value and the upper engine speed value, and selectively present only the first symbol at the first end to indicate that the upper engine speed value corresponds to a target engine speed.

20 Claims, 9 Drawing Sheets

THROTTLE CONTROL GRAPHICAL USER INTERFACE FOR A WORK VEHICLE

BACKGROUND

The disclosure relates generally to a graphical user interface (GUI) associated with a transmission system of a work vehicle.

Transmissions are typically used in work vehicles (e.g., agricultural and construction work vehicles) to transmit power from a power source, such as an internal combustion engine, to a load to accomplish a desired task. Certain work vehicles include a continuously variable transmission (CVT). A CVT is a transmission that may continuously adjust an effective gear ratio. In some instances, the flexibility of the CVT may enable the input shaft (e.g., the output shaft of the engine) to maintain a constant angular velocity, which may be beneficial for accomplishing certain tasks. For example, a CVT may be used to transmit power to wheels and/or tracks of a work vehicle.

In some instances, an operator may configure the transmission (e.g., CVT) of the work vehicle to operate in a desired mode (e.g., based on the task performed by the work vehicle). For example, the work vehicle may tow heavy equipment. Accordingly, the transmission may be operated in a desired mode that causes the transmission to output certain operating parameters, such as a high torque. Typically, an operator controls an engine speed lever and a transmission lever with little feedback confirming operation in the desired mode. As such, the ease of use and/or efficiency associated with operating the work vehicle may be reduced. In some instances, the loss in efficiency associated with the operation of the work vehicle may result in an increased duration in performing a task, etc.

BRIEF DESCRIPTION

In one embodiment, a control system for a work vehicle system includes one or more controllers that includes a memory and a processor, such that the one or more controllers instruct a graphical user interface to present a first indication having a member extending between a first end positioned below a second end positioned above the first end, and present a second indication indicative of an engine speed range, such that the second indication includes a lower engine speed value and an upper engine speed value. In addition, the one or more controllers instruct the graphical user interface to selectively present a first symbol at the first end and a second symbol at the second end to indicate that an engine speed varies between the lower engine speed value and the upper engine speed value, and selectively present only the first symbol at the first end to indicate that the upper engine speed value corresponds to a target engine speed.

In another embodiment, a control system for a work vehicle includes a transmission mode input device that receives a transmission mode input indicative of selection of a current transmission mode or a plurality of transmission modes, such that the plurality of transmission modes include an automatic transmission mode, a manual transmission mode, a power-takeoff operation (PTO) transmission mode, or any combination thereof. The control system also includes an engine speed input device that includes a first engine speed control feature that receives a first engine speed input indicative of a first engine speed and a second engine speed control feature that receives a second engine speed input indicative of a second engine speed. The control system also includes a controller communicatively coupled to the transmission mode input device and the engine speed input device, such that the controller includes a processor and a memory device storing instructions that when executed by the processor cause the processor to receive a first signal indicative of the current transmission mode from the transmission mode input device and receive a second signal indicative of the first and second engine speeds from the engine speed input device. The instructions also cause the processor to instruct a graphical user interface to present a first indication having a member extending between a first end and a second end, such that the second end is positioned above the first end. The instructions also cause the processor to present a second indication indicative of an engine speed range based on the second signal, such that the second indication includes an upper engine speed value and a lower engine speed value. The instructions also cause the processor to selectively present a first symbol at the first end of the member and a second symbol and the second end of the member, based on the first signal, the second signal, or any combination thereof, to indicate that an engine speed is configured to vary between the lower engine speed value and the upper engine speed value. The instructions also cause the processor to selectively present only the first symbol at the first end of the member, based on the first signal, the second signal, or any combination thereof, to indicate that the upper engine speed value corresponds to a target engine speed. The instructions also cause the processor to present a first icon, a second icon, or a combination thereof, along the member of the first indication to indicate the selection of the current transmission mode based on the first signal, the second signal, or any combination thereof.

In a further embodiment, at least one tangible, non-transitory, computer-readable medium that stores instructions executable by a processor, such that the instructions cause the processor to instruct a graphical user interface to present a first indication having a member extending between a first end positioned below a second end; present a second indication indicative of an engine speed range having a lower engine speed value and an upper engine speed value; selectively present a first symbol at the first end of the first indication and a second symbol and the second end of the first indication to indicate that an engine speed is configured to vary between the lower engine speed value and the upper engine speed value; and selectively present only the first symbol at the first end of the first indication to indicate the that upper engine speed value corresponds to a target engine speed.

DRAWINGS

These and other features, aspects, and advantages of the present disclosure will become better understood when the following detailed description is read with reference to the accompanying drawings in which like characters represent like parts throughout the drawings, wherein.

Figure 3:
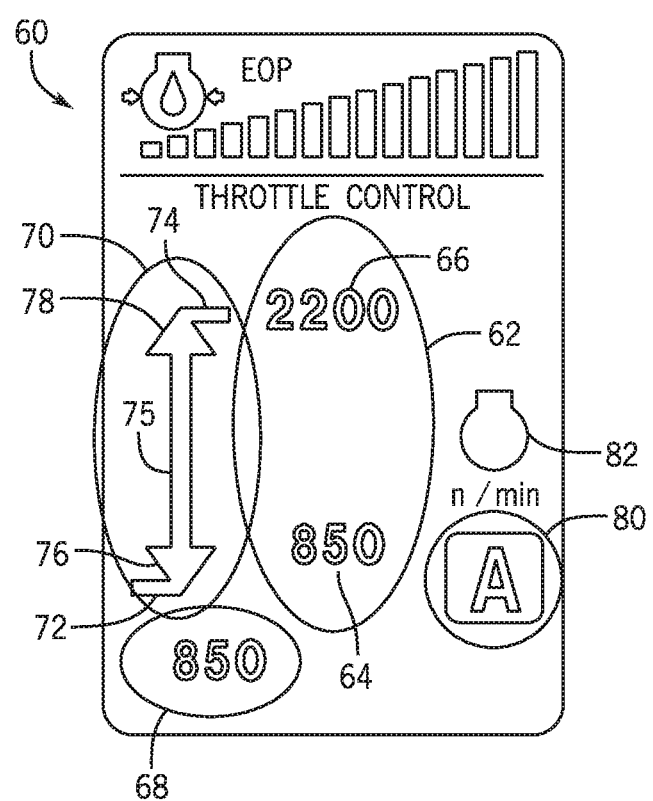
FIG. 3 is a schematic diagram of an embodiment of an engine speed control graphical user interface (GUI) that may be presented on a display of the transmission system of FIG. 2, in accordance with aspects of the present disclosure.
Figure 7:
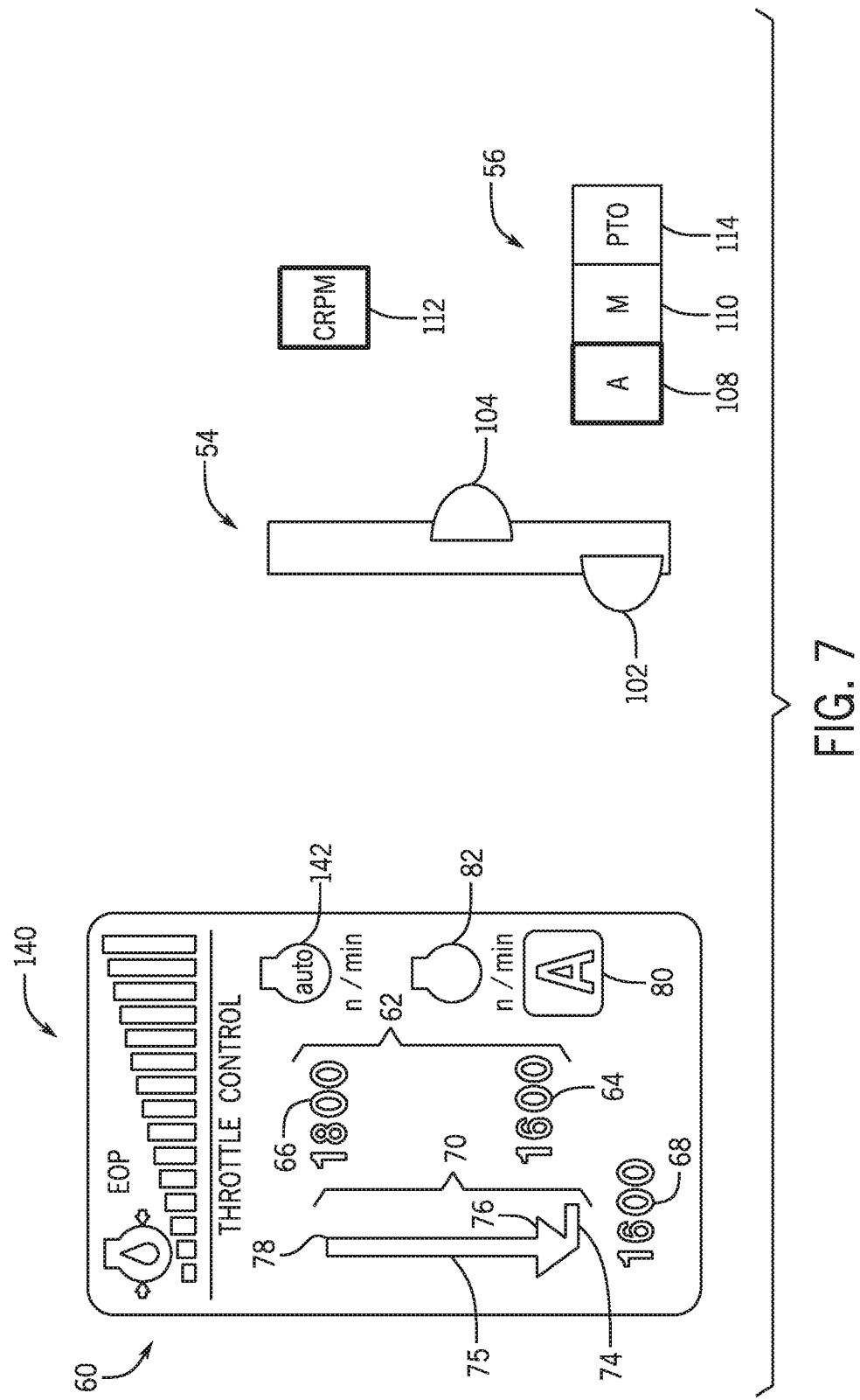
Figure 8:
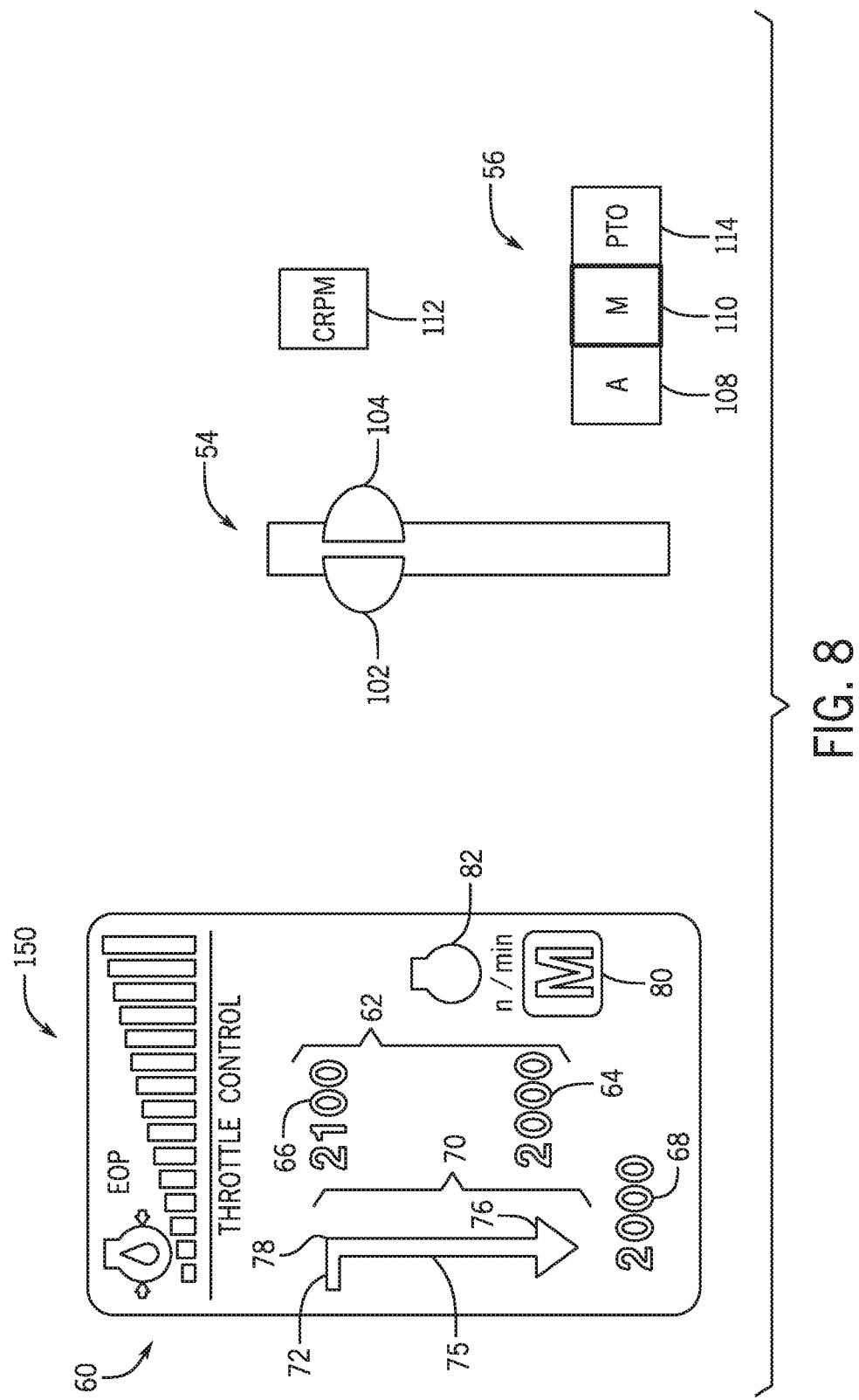
Figure 9:
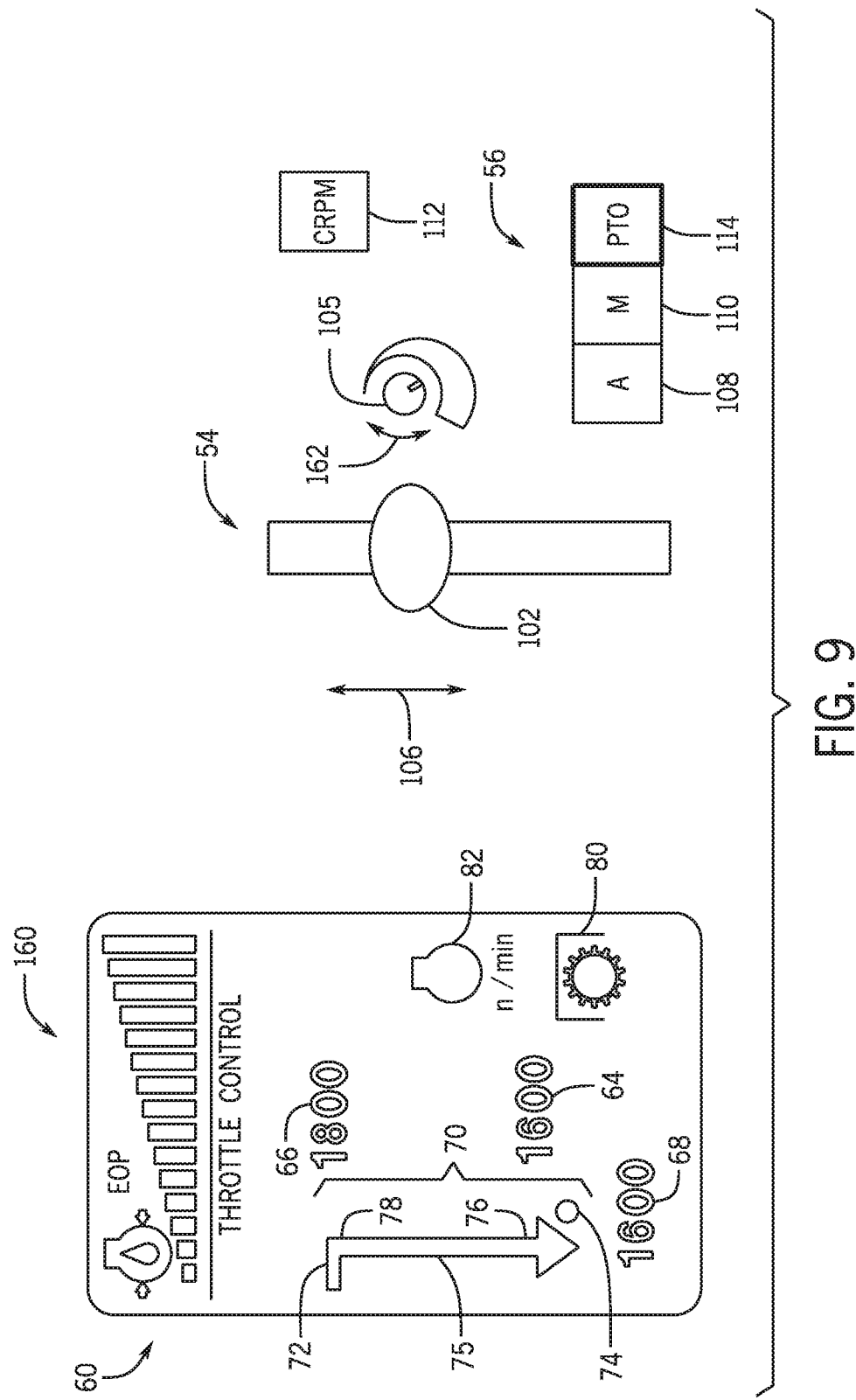

FIG. 7 is a schematic diagram of the engine speed control GUI of FIG. 3 in a fourth configuration based on the arrangement of the engine speed input device and the CVT mode input device, in accordance with aspects of the present disclosure FIG. 8 is a schematic diagram of the engine speed control GUI of FIG. 3 in a fifth configuration based on the arrangement of the engine speed input device and the CVT mode input device, in accordance with aspects of the present disclosure; and FIG. 9 is a schematic diagram of the engine speed control GUI of FIG. 3 in a sixth configuration based on the arrangement of the engine speed input device and the CVT mode input device, in accordance with aspects of the present disclosure.

DETAILED DESCRIPTION

Generally, an operator of a work vehicle is provided with little feedback regarding operating parameters associated with a transmission of the work vehicle. Accordingly, operating at a desired CVT mode and engine speed mode may be difficult to achieve or cause operator confusion. The present disclose relates to an engine speed control graphical user interface (GUI), which presents feedback indicative of present engine speed mode of operation and a continuously variable transmission (CVT) mode of operation. By presenting an operator with an easy-to-read engine speed control GUI, which includes feedback indicative of the operating parameters (e.g., present engine speed mode and the CVT mode), the operator of the work vehicle may more easily operate the work vehicle at target operating parameters to more efficiently accomplish a variety of tasks. When it is mentioned that the GUI performs a certain operation (e.g., presenting certain indications), it should be noted that in some embodiments, the certain operation is performed by the GUI in response to the GUI being instructed by one or more controllers to perform the certain operations.

Figure 1:
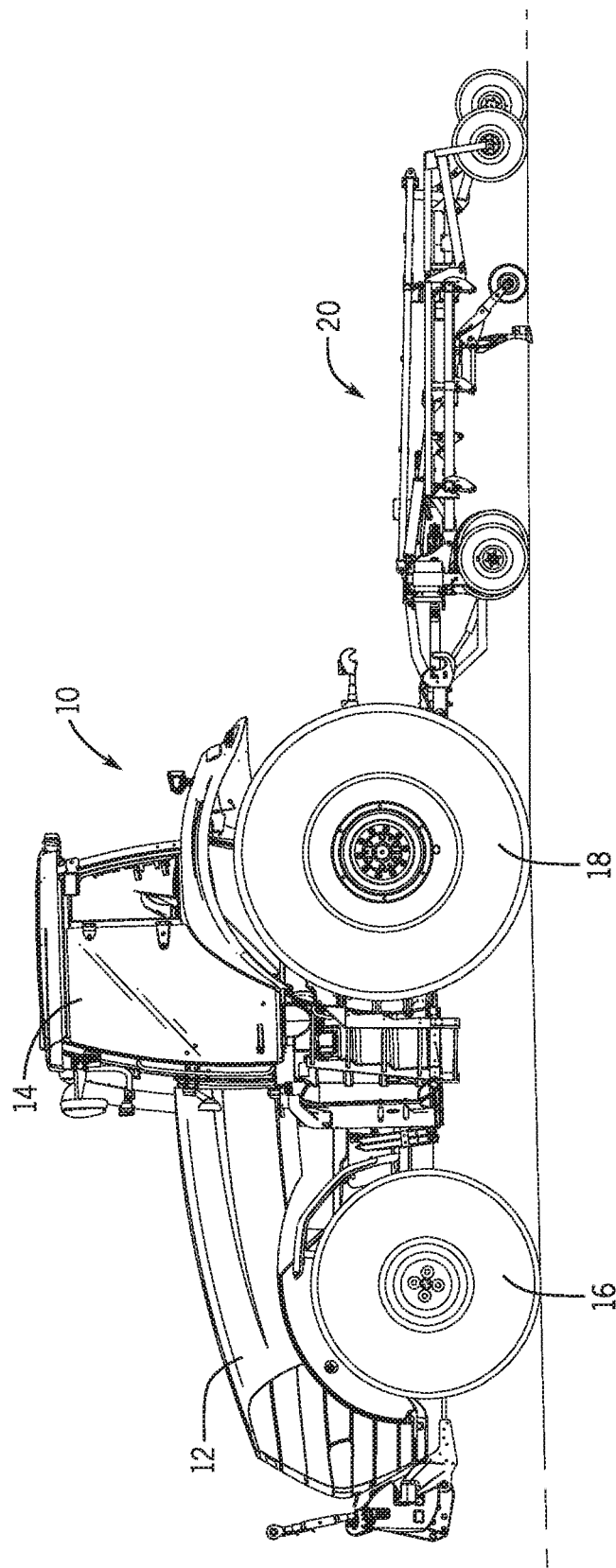
FIG. 1 is a side view of an embodiment of a work vehicle that may employ a transmission system, in accordance with aspects of the present disclosure.

With the foregoing in mind, FIG. 1 is a side view of a work vehicle 10 that may employ a transmission system, in accordance with aspects of the present disclosure. The work vehicle 10 may be any suitable type of work vehicle, such as a loader, a tractor, a grader, a backhoe, a forklift, an agricultural vehicle, or another suitable type of vehicle that utilizes a transmission. The work vehicle 10 has a body 12 that may house an engine, transmission, and power train. Further, the work vehicle 10 has a cabin 14 where an operator may sit or stand to operate the work vehicle 10. The engine speed control GUI disclosed herein may be presented via a display positioned inside the cabin 14 to provide the operator feedback indicative of the operating parameters of the work vehicle 10. However, in further embodiments, the GUI may be presented on a display of a base station. In the illustrated embodiment, the work vehicle 10 has two front wheels 16 and two rear wheels 18 that rotate to drive motion of the work vehicle 10. The work vehicle 10 may drive the wheels 16 and 18 using a transmission. For example, the work vehicle 10 may include a CVT configured to transfer power from the engine to the wheels 16 and 18. While the disclosure below includes a discussion of the engine speed control GUI used in a work vehicle that employs a CVT, in further embodiments, the engine speed control GUI may be used on a work vehicle that employs another suitable type of transmission (e.g., a full power shift transmission, a dual-clutch transmission, a semi-automatic transmission, etc.). While the illustrated embodiment, the work vehicle 10 includes wheels 16, 18, in further embodiments, the work vehicle 10 may include any combination of wheels or tracks.

In the illustrated embodiment, the work vehicle 10 is towing an implement 20. While in the illustrated embodiment the implement 20 is a tillage tool, in further embodiments, the implement may be a seeder, fertilizer spreader, a mower, a spreader, a snow blower, etc. In some embodiments, the operating parameters for efficiently accomplishing a task while the implement 20 is coupled to the work vehicle 10 may be different than the operating parameters for driving motion of the work vehicle 10 while the implement 20 is absent. By receiving feedback indicative of the operating parameters, an operator may operate the work vehicle 10 closer to target operating parameters to more efficiently accomplish the task. Operating the work vehicle closer to target operating parameters may enhance the efficiency of the operations performed by the work vehicle. For example, in some embodiments, operating the work vehicle closer to target operating parameters may reduce fuel consumption and may enhance to speed at which tasks are completed.

Figure 2:
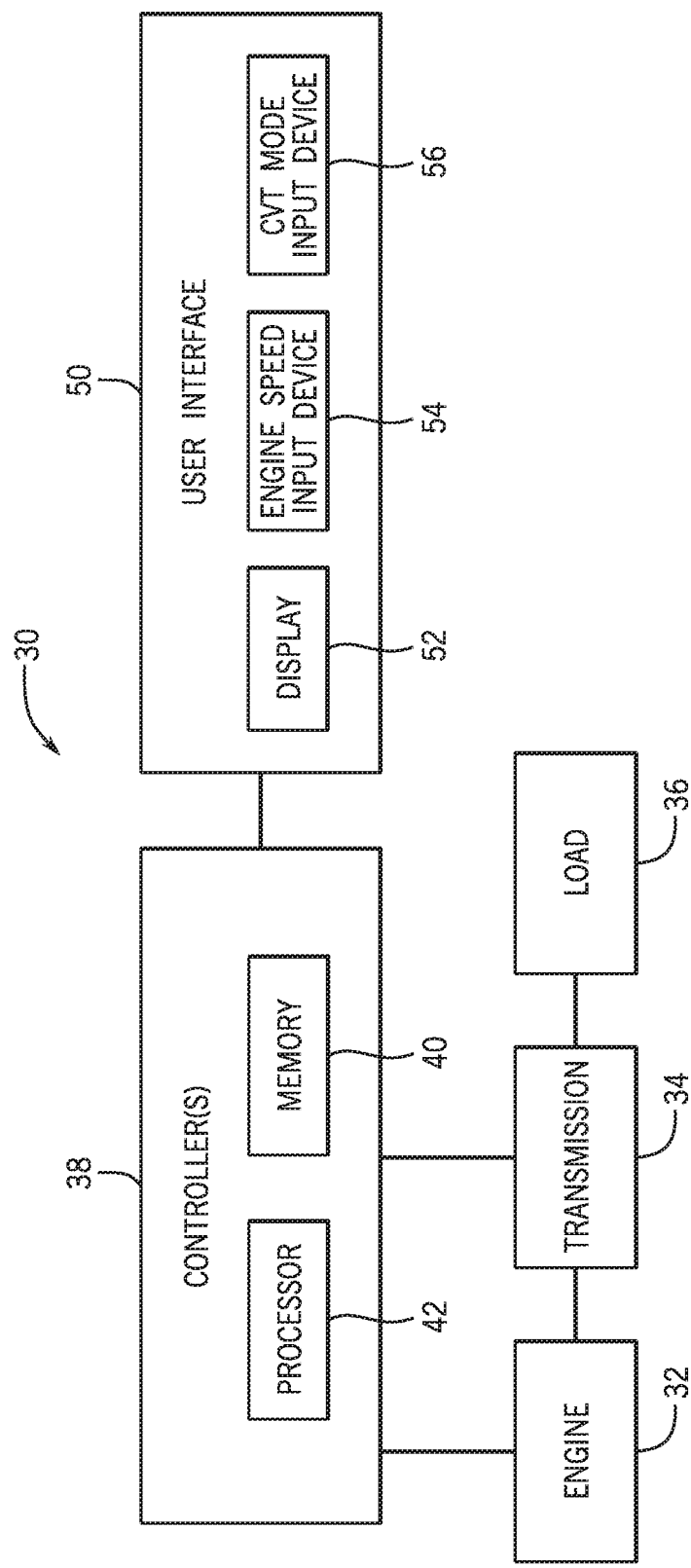
FIG. 2 is a block diagram of an embodiment of a transmission system that may be employed within the work vehicle of FIG. 1, in accordance with aspects of the present disclosure.

FIG. 2 is a block diagram of an embodiment of a transmission system 30 that may be employed within the work vehicle 10 of FIG. 1, in accordance with aspects of the present disclosure. An engine 32 (e.g., an internal combustion engine) provides power to drive a transmission 34 of the transmission system 30. The transmission 34 may include a hydraulic system, a planetary gear unit, seals and gaskets, a torque converter, a modulator, and sensor(s), etc. In some embodiments the transmission 34 is a CVT configured to continuously adjust effective gear ratios. An output from the transmission 34 drives a load 36, such as the wheels of the work vehicle. As mentioned above, while the embodiments described herein include an engine speed control GUI in a work vehicle that employs a CVT, in further embodiments, the engine speed control GUI may be employed on a work vehicle that employs any other suitable transmission (e.g., a full power shift transmission, a dual-clutch transmission, a semi-automatic transmission, etc.).

The transmission system 30 furthers include a control system, which includes controller 38 configured to control various systems and units within the transmission 34. As used herein, "controller" may be referred to in the singular, but it should be understood that the embodiments disclosed herein are not limited to employing one controller. Indeed, in some embodiments, one or more controllers may be employed, for example, to distribute computations, enhance implementation, and the like. As illustrated, the controller 38 includes one or more memory device(s) 40 and one or more processor(s) 42. For example, the memory device(s) 40 may include volatile memory, such as random-access memory (RAM), and/or non-volatile memory, such as read-only memory (ROM), optical drives, hard disc drives, solid-state drives, or a combination thereof. Additionally, the one or more processor(s) 42 may include one or more application specific integrated circuits (ASICs), one or more field-programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, ASICs, and other programmable circuits. The memory device(s) 40 (e.g., non-transitory computer-readable medium/memory circuitry) may store one or more sets of instructions (e.g., processor-executable instructions) implemented to operate the transmission 34. In operation, the controller 38 uses the processor(s) 42 to execute instructions stored in the memory device(s) 40 to control the transmission 34 and to present certain information via the engine speed control GUI. For example, the controller 38 may receive instructions to change gear ratios while the work vehicle 10 is moving (e.g., at different speeds), as described in detail below.

In the illustrated embodiment, the transmission system 30 includes a user interface 50 configured to present data, via the display 52, indicative of the operating parameters of the transmission. The display 52 may be a liquid crystal display (LCD), an electroluminescent display (ELD), a cathode ray tube (CRT) display, and/or a light emitting diode (LED) display, etc. Furthermore, in some embodiments, the display 52 may be a touch screen device that includes various sensor configured to receive tactile inputs. The display 52 may present the engine speed control GUI discussed in detail below. The user interface 50 may also receive various user inputs. For example, the user interface 50 may include an engine speed input device 54. The engine speed input device 54 may receive a first set of user inputs to control the engine speed mode of the engine 32. In some embodiments, the engine speed input device 54 may include at least one lever configured to be moved into a variety of positions corresponding to various engine speed modes. In further embodiments, the engine speed input device may be a foot pedal that, when depressed, controls the engine speed mode, a knob that, when turned, controls the engine speed mode, a feature of the display 52 (e.g., touch screen) that, when touched, controls the engine speed mode, and the like. In some embodiments, the engine speed input device 54 may include one or more buttons. Additionally, in some embodiments, the engine speed input device 54 may be configured to operate the engine speed at a constant revolutions per minute (CRPM) mode. For example, when the one or more buttons or the display 52 receive the user inputs, the engine speed may operate in the CRPM engine speed mode.

The user interface 50 also includes a CVT mode input device 56. The CVT mode input device 56 may receive user inputs communicated to the controller to control the operating mode of the transmission 34. In some embodiments, the CVT mode input device 56 may be a lever configured to be moved into a variety of positions corresponding to various transmission modes (e.g., an automatic mode, a manual mode, etc.). In further embodiments, the CVT mode input device may include multiple buttons that, when depressed, set the transmission to a corresponding mode, a knob that, when turned, set the transmission to a corresponding mode, a feature of the display 52 (e.g., touch screen) that, when touched, set the transmission to a corresponding mode, and the like. In addition or alternatively, the CVT mode input device 56 may include a single button that when depressed enables the CVT mode input device 56 to switch between a plurality of CVT modes. Furthermore, in some embodiments, the CVT mode may automatically be switched based on whether a power take-off (PTO) mode is on or off. However, to facilitate discussion, the CVT mode input device is depicted below as selectable blocks. The display 52 may present data indicative of the engine speed mode and the CVT mode.

FIG. 3 is a schematic diagram of an embodiment of an engine speed control GUI 60 that may be presented on the display of the transmission system of FIG. 2, in accordance with aspects of the present disclosure. In the illustrated embodiment, the engine speed control GUI 60 includes a first indication 62 indicative of a range of speeds for the engine (hereinafter "the engine speed range"). As illustrated, various indications of the engine speed control GUI 60 are circled to facilitate identification of the indications and to facilitate discussion. As such, the circles around the various indications of the engine speed control GUI 60 may not be presented within the engine speed control GUI. In the illustrated embodiment, the first indication 62 includes a lower limit 64 for the engine speed range and an upper limit 66 for the engine speed range. The lower limit 64 and the upper limit 66 may each be depicted as numbers in any suitable units (e.g., revolutions per minute (RPM)). For example, in the illustrated embodiment, the upper limit 66 is depicted as 2200 (e.g., RPM) and the lower limit 64 is depicted as 850 (e.g., RPM). In further embodiments, the upper limit and/or the lower limit may indicate the engine speed in revolutions per second, revolutions per hours, or any other suitable units of speed. As discussed in detail below, the first indication may dynamically change (e.g. at or near real-time) based on input from the engine speed input device and/or the CVT mode input device.

In the illustrated embodiment, the engine speed control GUI 60 includes a second indication 68 indicative of the minimum engine speed. For example, the second indication 68 may be displayed as a number corresponding to the minimum engine speed (e.g., 850 RPM). The units of the second indication 68 (e.g., RPM) may match the units (e.g., RPM) of the first indication 62. In some embodiments, the minimum speed engine speed is controlled by the engine speed input device. In addition, the minimum engine speed/second indication 68 may match the lower limit 64 of the first indication 62.

Furthermore, in the illustrated embodiment, the engine speed control GUI 60 includes a third indication 70 indicative of the engine speed mode of the engine speed input device and the CVT mode of the CVT mode input device. The third indication 70 includes a left hand (LH) icon 72 and a right hand (RH) icon 74. As discussed in detail below and to facilitate discussion, the LH icon 72 and the RH icon 74 may each correspond to a lever of the engine speed input device. In the illustrated embodiment, when the LH icon 72 is positioned lower than the RH icon 74, the LH icon 72 establishes the lower limit 64 and the RH icon 74 establishes the upper limit 66. Furthermore, when the LH icon 72 is positioned lower than the RH icon 74, the LH engine speed lever controls the lower limit 64 and the RH engine speed lever controls the upper limit 66. Additionally, when the LH icon 72 is positioned lower than the RH icon 74, the lower limit 64 may be the lowest engine speed the engine may drive the work vehicle at and the upper limit 66 may instead be a speed target. As described in detail below, the upper and lower limit 66, 64 may signify different speed parameters, based on the CVT mode and engine speed mode.

Alternatively, when the LH icon 72 is positioned above the RH icon 74, the LH icon 72 may establish the upper limit 66 and the RH icon 74 may establish the lower limit 64. As described in detail below, the upper and lower limit 66, 64 may signify different speed parameters, based on the CVT mode and engine speed mode. In further embodiments, the LH icon and/or the RH icons may move (e.g., vertically) on the engine speed control GUI to indicate the position of the respective engine speed input device. Furthermore, while in the illustrated embodiment the LH icon 72 and the RH icon 74 are depicted as rectangles, in further embodiments, the LH icon and/or the RH icon may be depicted as any other suitable icon (e.g., a circle, a box, a star, etc.). Furthermore, the third indication 70 includes a vertical member 75 having a first end 76 and a second end 78. The shape of each of the first end 76 and the second end 78 may be used to designate certain engine speed modes and CVT modes, as discussed in detail below. For example, when the first end 76 and the second end 78 include a certain shape (e.g., the illustrated arrows), the vertical member 75 may indicate that the engine may freely operate between the engine speed range defined by the upper limit 66 and the lower limit 64.

In addition, in the illustrated embodiment, the engine speed control GUI 60 includes a fourth indication 80 indicative of the CVT mode icon. As discussed below, the CVT mode icon may include a letter indicating that the CVT is operating in an automatic mode, a manual mode, in a power take-off (PTO) mode, etc. In further embodiments, the CVT mode icon may be any suitable symbol (e.g., a chain link, a gear, a shape, etc.) indicative of any suitable mode of operation. In further embodiments, the CVT mode icon may include text, a symbol, or a combination thereof. Furthermore, the engine speed control GUI 60 includes a fifth indication 82 indicative of the units associated with the first indication 62 and second indication 68. For example, in the illustrated embodiment, the fifth indication 82 is an icon with a label "n/min," which indicates that the units of the numbers (e.g., of the first indication 62 and the second indication 68) presented on the engine speed control GUI are in RPM. In further embodiments, any suitable icon and labeling may be used to designate any suitable units associated with the numeric values presented by the engine speed control GUI.

While in illustrated embodiment the engine speed control GUI 60 includes five indications (e.g., the first indication 62, the second indication 68, the third indication 70, the fourth indication 80, and the fifth indication 82), in further embodiments, any of the aforementioned indications may be omitted from the engine speed control GUI. For example, only the first indication 62, the second indication 68, the third indication 70, and the fourth indication 80 may be included within the engine speed control GUI 60, such that the fifth indication 82 is omitted. Further, additional indication(s) may be presented by the engine speed control GUI 60. For example, the engine speed control GUI 60 may present an indication that designates a symbol for the engine operating in the CRPM engine speed mode, another indication for the load on the engine, etc. Further, the engine speed control GUI 60 may be configured to display content in any suitable language.

Figure 4:
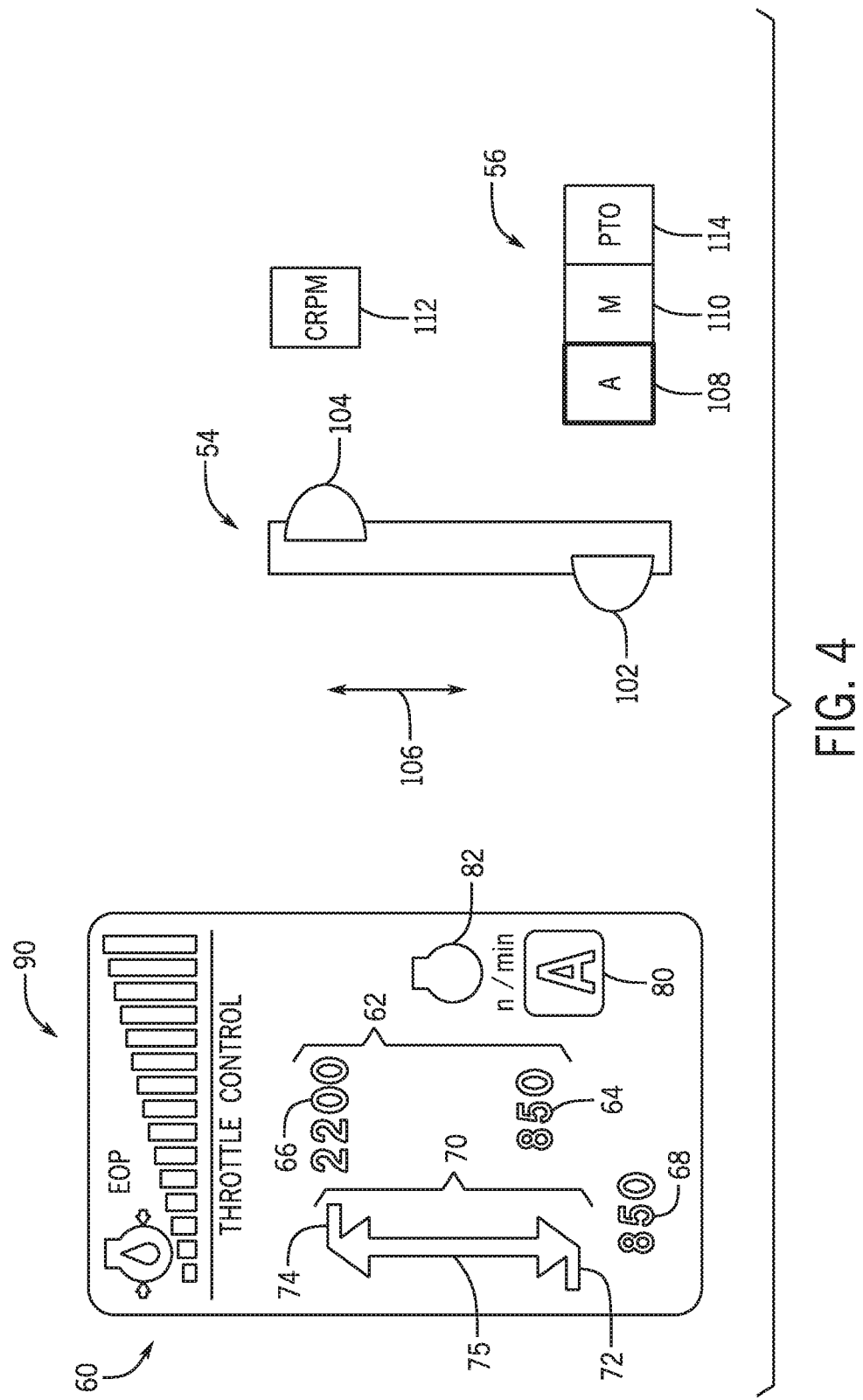
FIG. 4 is a schematic diagram of the engine speed control GUI of FIG. 3 in a first configuration based on an arrangement of an engine speed input device and a continuously variable transmission (CVT) mode input device, in accordance with aspects of the present disclosure.

FIG. 4 is a schematic diagram of the engine speed control GUI 60 of FIG. 3 in a first configuration 90 based on an arrangement of the engine speed input device 54 and the CVT mode input device 56, in accordance with aspects of the present disclosure. In the illustrated embodiment, the engine speed input device 54 includes a left hand (LH) engine speed lever 102 and a right hand (RH) engine speed lever 104 that may each move along an axis 106. In some embodiments, the engine speed input device 54 may include one or more buttons. In the illustrated embodiment, the engine speed input device 54 includes a CRPM engine speed mode button 112. For example, when the one or more buttons or the display 52 receive the user inputs, the engine speed may operate in the CRPM engine speed mode. While in the illustrated embodiment, the engine speed input device 54 includes two levers and a button, in further embodiments, at least one engine speed input may include a touch screen, a knob configured to turn to indicate values, or a button configured to depress various depths, among other suitable input(s). Furthermore, while the engine speed levers of the engine speed input device may only move along the axis 106, in further embodiments, the engine speed levers may be configured to move in any suitable direction(s).

The CVT mode input device 56 include buttons that, when depressed, modify the CVT mode (e.g., transmission mode). However, in alternative embodiment, the CVT mode input device may include a knob that, when turned, modifies the CVT mode, a feature of the display (e.g., touch screen) that, when touched, modifies transmission mode, and the like. In some embodiments, the CVT mode input device 56 may include one or more buttons. In the illustrated embodiment, the CVT mode input device 56 includes a first button 108 indicative of operation of the transmission and/or engine speed in the automatic mode, a second selectable button 110 indicative of operation of the transmission and/or engine speed in the manual mode, and a third button 114 indicative of operation of the transmission and/or engine speed in the PTO mode. In further embodiments, the modes controlling the operation of the transmission and engine speed may be selected from the engine speed control GUI. Further, certain mode(s) may be omitted from the CVT mode input device 56, and/or other mode(s) may be included in the CVT mode input device 56. In some embodiments, the controller may receive a user input (e.g., indicative of the first, second, or third, button being depressed, In the illustrated embodiment, the button 108 corresponding to the automatic mode of operation is selected. Accordingly, the fourth indication 80 indicates that the work vehicle is operating in the automatic mode. Furthermore, the fifth indication 82 indicates that the units of the numeric values depicted on the engine speed control GUI are in RPM. In the illustrated embodiment, the LH engine speed lever 102 is in the fully reward position (e.g., along the axis 106) and the RH engine speed lever 104 is in the fully forward position (e.g., along the axis 106). As such, the LH icon 72 is below the RH icon 74 because the LH engine speed lever 102 is positioned reward the RH engine speed lever. The arrangement of the LH and RH icons 72, 74 (e.g., the LH icon 72 below the RH icon 74) may serve as indications that the LH engine speed lever 102 may adjusts the minimum speed and the RH engine speed lever 104 may establish the target engine speed. In some embodiments, the positions of the LH and RH engine speed levers 102, 104 correspond the range of speeds of the engine. Additionally or alternatively, the position of the LH icon 72 and the RH icon 74 of the third indication 70 may each correspond to the position of the LH and RH engine speed levers 102, 104. Because the LH engine speed lever 102 is positioned rearward of the RH engine speed lever 104, the LH engine speed lever 102 may establish the lower limit 64 of the engine speed (e.g., 850 RPM), and the RH engine speed lever 104 may establish the upper limit 66 of the engine speed (e.g., 2200 RPM). After the engine speed input device 54 establishes the engine speed mode, the engine speed control GUI 60 may display this engine speed mode. While in the illustrated embodiment, the LH engine speed lever 102 and the RH engine speed lever 104 may set the engine speed range anywhere between 850 and 2200 RPM, in further embodiments, the engine speed range may include any suitable lower and upper limits. As discussed in detail below, moving the LH engine speed lever 102 forward may raise the lower limit 64 (which is represented on the engine speed control GUI 60 as a numeric value for the lower limit) of the engine speed (e.g., up from 850 RPM), while moving the RH engine speed lever 104 rearward may lower the upper limit 66 (which is represented on the engine speed control GUI as a numeric value for the upper limit) of the engine speed (e.g., down from 2200 RPM), and vice versa. The engine speed control GUI 60 may update the first indication 62 (e.g., at or near real-time) to reflect the updated values of the lower and upper limits 64, 66. In some embodiments, the engine speed lever (e.g., RH or LH) that establishes the lower limit 64 may also establish the minimum speed, which is represented on the engine speed control GUI 60 as a numeric value for the minimum speed (e.g., 850 RPM in the illustrated embodiment). In some embodiments, the engine speed lever (e.g., RH or LH) positioned most rearward may control the minimum speed.

Further, in the illustrated embodiment, the first configuration 90 of the engine speed control GUI 60 includes the LH icon 72 positioned rearward (e.g., below) relative to the RH icon 74 on the third indication 70. The positions of the LH and RH icons 72, 74 indicate that the LH engine speed lever 102 is positioned rearward to the RH engine speed lever 104. In some embodiments, as the LH engine speed lever 102 is positioned forward or rearward, the LH icon 72 may be moved accordingly. Similarly, as the RH engine speed lever 104 is positioned forward or rearward, the RH icon 74 may also be moved accordingly. Furthermore, as the engine speed range increases or decreases, the size (e.g., length) of the third indication may also increases and or decrease. For example, the length of the vertical member 75 may increase as the engine speed range increase, and the length of the vertical member 75 may decrease as the engine speed range decreases. In some embodiments, the increase and decrease in length are based on the positions of engine speed levers 102, 104. As such, the vertical member 75 may shorten as the distance between the LH icon 72 and the RH icon 74 decreases on the engine speed control GUI 60.

In the first configuration 90, the double arrow of the third indication 70 indicates that the engine speed may vary upwardly and downwardly within the engine speed range indicated by the first indication 62, as controlled by the LH and RH engine speed levers 102, 104 of the engine speed input device 54. As mentioned above, in the illustrated embodiment the fourth indication 80 (e.g., including the letter "A") indicates that the transmission is operating in the automatic mode. The first configuration 90 may convey to the operator that a controller may control the engine speed within the range presented by the engine speed control GUI 60. In some embodiments, if the engine speed drops below the minimum speed indicated by the second indication 68, the transmission automatically shifts to a lower gear ratio to increase engine speed above the minimum speed. Furthermore, the first configuration 90 may convey that the work vehicle is operating in fuel efficient operating mode, since the transmission may operate through a wide range of engine speed ranges, choosing the most efficient gear ratio. In some embodiments, the operator may wish to receive the feedback of the first configuration 90 to confirm that the work vehicle is operating in a desired CVT mode and engine speed mode. The input provided by the operator to the engine speed input device 54 and the CVT mode input device 56 may be reflected on the engine speed control GUI 60, such that the engine speed control GUI 60 provides feedback (e.g., via the first indication 62, the second indication 68, the third indication 70, the fourth indication 80, the fifth indication 82, or any combination thereof) that may facilitate operation of the work vehicle. In some embodiments, a visual indication (e.g., similar to that displayed on the engine speed control GUI) may enable an operator to receive visual feedback indicative of how the transmission is operating. As such, the operator experience may be enhanced and certain operations may more easily be achieved by an operator by using the engine speed control GUI disclosed herein.

Figure 5:
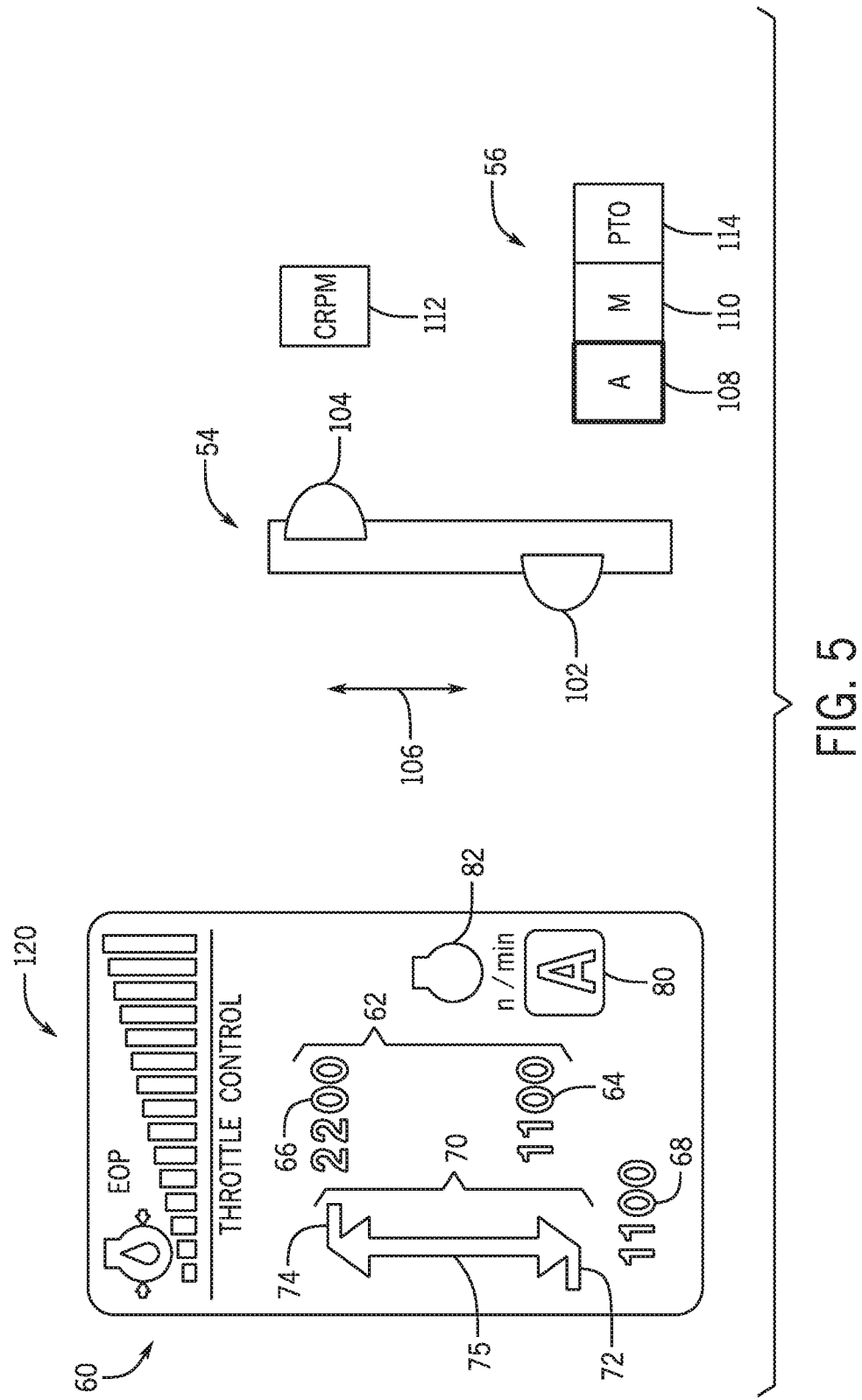
FIG. 5 is a schematic diagram of the engine speed control GUI of FIG. 3 in a second configuration based on the arrangement of the engine speed input device and the CVT mode input device, in accordance with aspects of the present disclosure.

FIG. 5 is a schematic diagram of the engine speed control GUI 60 of FIG. 3 in a second configuration 120 based on an arrangement of the engine speed input device 54 and the CVT mode input device 56, in accordance with aspects of the present disclosure. The second configuration 120 is different than the first configuration 90 of FIG. 4 due to a different position of the LH engine speed lever 102 of the engine speed input device 54. In the illustrated embodiment, the automatic mode button 108 of the CVT mode input device 56 is depressed, such that the engine speed operates in the automatic mode and the engine speed control GUI 60 presents the letter "A" as the fourth indication 80. Furthermore, the fifth indication 82 indicates that the units of the numeric values depicted on the engine speed control GUI are in RPM. In the illustrated embodiment, the LH engine speed lever 102 is positioned forward along the axis 106 relative to the position shown in FIG. 4 to increase the lower limit from 850 RPM to 1100 RPM. Accordingly, the controller instructs the engine speed control GUI 60 to update the first indication 62 to reflect the new value (i.e., 1100 RPM) for the lower limit 64 and may update the second indication 68 to a new minimum speed. In some embodiments, the LH icon 72 may move upward on the third indication 70 in response to the LH engine speed lever 102 moving forward (e.g., being raised). In some embodiments, moving the LH icon 72 may also modify the size of the third indication 70 (e.g., the length of the vertical member 75).

In the illustrated embodiment, the double arrow of the vertical member 75 of the third indication 70 indicates that the engine speed is operating in a fully automatic mode. As such, the engine speed may vary between the minimum and maximum speeds, which are established by the LH and RH engine speed levers 102, 104 of the engine speed input device 54, and are presented on the engine speed control GUI 60 as the minimum speed (e.g., the lower limit 64) and the maximum speed (e.g., the upper limit 66). In the fully automatic mode, the transmission may operate between the minimum speed (e.g., the lower limit 64) and the maximum speed (e.g., the upper limit 66), such that the transmission may freely transition between various gear rations to operate between the minimum speed (e.g., the lower limit 64) and the maximum speed (e.g., the upper limit 66). As mentioned above, the fourth indication 80 indicates that the engine speed control is operating in the fully automatic mode. The second configuration 120 conveys to the operator that the engine speed may vary between the engine speed ranges presented by the engine speed control GUI 60. In some embodiments, an operator may wish to receive the feedback of the second configuration 120 to confirm that the work vehicle is operating in a mode that enables automatic transmission modes between the specified engine speed ranges. As such, the operator experience may be enhanced and operating the work vehicle at target parameters may more easily be achieved by an operator by using the engine speed control GUI disclosed herein. Operating the work vehicle closer to target operating parameters may enhance the efficiency of the operations performed by the work vehicle. For example, in some embodiments, operating the work vehicle closer to target operating parameters may reduce fuel consumption and may enhance to speed at which tasks are completed. Furthermore, the second configuration 120 may convey that the minimum speed (i.e., 1100 RPM) that is higher than that of the first configuration 90 of FIG. 4 (i.e., 850 RPM).

Figure 6:
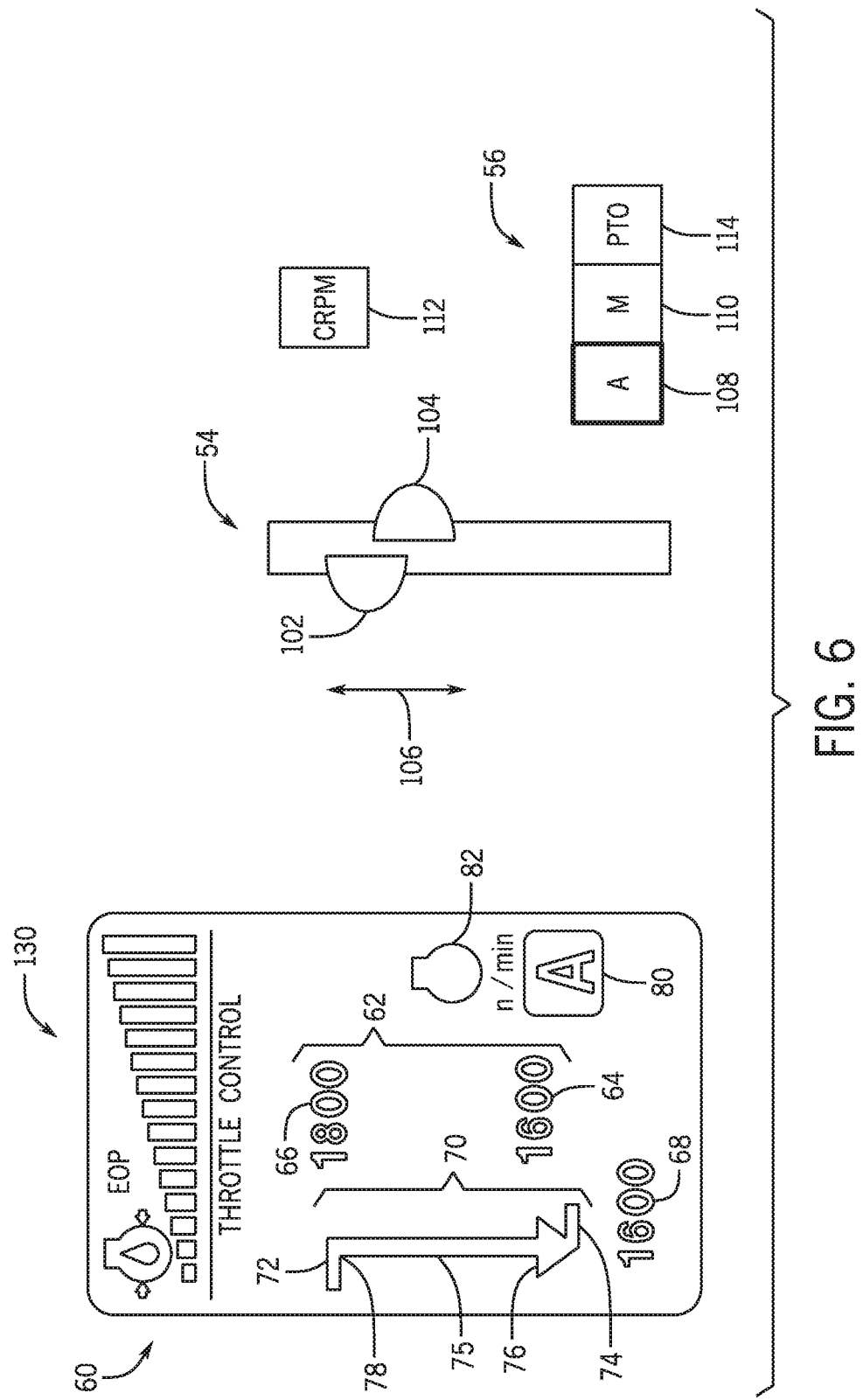
FIG. 6 is a schematic diagram of the engine speed control GUI of FIG. 3 in a third configuration based on the arrangement of the engine speed input device and the CVT mode input device, in accordance with aspects of the present disclosure.

FIG. 6 is a schematic diagram of the engine speed control GUI 60 of FIG. 3 in a third configuration 130 based on the arrangement of the engine speed input device 54 and the CVT mode input device 56, in accordance with aspects of the present disclosure. The third configuration 130 is different from the second configuration 120 of FIG. 4 due to a different position of the LH engine speed lever 102 and the RH engine speed lever 104 of the engine speed input device 54. In some embodiments, when one lever is more forward than the other lever, the corresponding throttle may output a higher engine speed, than that of the other lever. In the illustrated embodiment, the automatic mode button 108 of the CVT mode input device 56 is depressed, such that the engine speed operates in the automatic mode and the engine speed control GUI 60 presents the letter "A" as the fourth indication 80. Furthermore, the fifth indication 82 indicates that the units of the numeric values depicted on the engine speed control GUI are in RPM. In the illustrated embodiment, the LH engine speed lever 102 is positioned forward along the axis 106 relative to the position in FIG. 5, such the LH engine speed lever 102 is forward of the RH engine speed lever 104. In this configuration, the LH engine speed lever 102 controls the requested engine speed (1800 RPM, as indicated by the upper limit 66) and the RH engine speed lever 104 controls the lower limit (e.g., 1600 RPM, as indicated by the lower limit 64) and minimum speed (e.g., 1600 RPM, as indicated by the second indication 68).

When the LH engine speed lever 102 is positioned further forward or even with the RH engine speed lever 104, the engine speed control GUI 60' 70 indicates that the upper limit 66 (e.g., 1800 RPM) is the target operating engine speed and the lower limit 64 (e.g., 1600 RPM) is the lower allowable engine speed the work vehicle may operate at. As such, the third configuration 130 indicates that the controller controls the engine speed to substantially match the target engine speed presented as the upper limit 66 and enables the engine speed to the lower limit 64, as needed, enabling the transmission to shift to lower gear ratios if the engine speed drops below the lower limit 64. That is, when the LH icon 72 is above or even with the RH icon 74, and the first end 76 includes the arrow and the second end 78 omits the arrow, as illustrated, the engine speed control GUI 60 conveys that the engine speed may initially operate at a target engine speed (e.g., upper limit 66) specified by the LH engine speed lever 102 and when the engine speed drops below the value (e.g., lower limit 64) specified by the RH engine speed lever 104, the transmission may shift to a lower gear ratio. In some instances, an operator may operate in the third configuration 130 when a target engine speed is desired, for example, for high power applications.

FIG. 7 is a schematic diagram of the engine speed control GUI 60 of FIG. 3 in a fourth configuration 140 based on an arrangement of the engine speed input device 54 and the CVT mode input device 56, in accordance with aspects of the present disclosure. The fourth configuration 140 is different from the first, second, and third configurations due to operator inputs to the engine speed input device 54 and the CVT mode input device 56. In the illustrated embodiment, the CRPM engine speed mode button 112 of the engine speed input device 54 is depressed. Accordingly, the controller automatically determines engine speed and instructs the engine speed control GUI 60 to present a sixth indication 142 indicating that the controller is operating in a constant engine speed mode (e.g., in a CRPM engine speed mode). Furthermore, in some embodiments, the engine speed control GUI presents the letter "A" as the fourth indication 80 when the CVT mode input device is set to automatic mode. Furthermore, the fifth indication 82 indicates that the units of the numeric values depicted on the engine speed control GUI 60 are in RPM. In the illustrated embodiment, the RH engine speed lever 104 is positioned along the axis 106 to set the lower engine speed limit to 1600 RPM, as shown by the lower limit 64. The LH icon 72 is omitted from the third indication 70 in response to the selection of the CRPM button engine speed mode 112, indicating that the input is not received from the LH engine speed lever 102.

In the illustrated embodiment, the first end 76 of the vertical member 75 of the third indication 70 includes an arrow and the second end 78 omits the arrow, such that the third indication 70 and the sixth indication 142 indicate that the controller is operating in a CRPM engine speed mode. In some embodiments, when, the first end 76 of the vertical member 75 includes an arrow and the second end 78 omits the arrow, the third indication 70 may indicate that the upper limit 66 is the target engine speed and the lower limit 64 is the minimum engine speed. While in the CPRM engine speed mode, the RH engine speed lever 104 controls the lower limit 64, such that the lower limit 64 specifies the minimum engine speed before the transmission shifts to a lower gear ratio. Furthermore, in the illustrated embodiment, the engine speed control GUI 60 omits the LH icon to indicate that input from the LH engine speed lever 102 is not being utilized by the controller because the controller automatically sets the target engine speed. In some embodiments, the controller may terminate the CRPM engine speed mode, when the LH engine speed lever 102 is moved. In some embodiments, the controller may continue to operate the work vehicle at the automatic mode (corresponding to the first button 108) when the controller terminates the CRPM engine speed mode. In further embodiments, the controller may continue to operate the work vehicle at any suitable mode (e.g., manual mode, PTO mode, etc.) after termination of operation in the CRPM engine speed mode. In response to termination of the CRPM engine speed mode, the engine speed control GUI 60 may be updated by the controller, such that that the sixth indication 142 is removed and the LH icon 72 is added to the third indication 70.

FIG. 8 is a schematic diagram of the engine speed control GUI 60 of FIG. 3 in a fifth configuration 150 based on the arrangement of the engine speed input device 54 and the CVT mode input device 56, in accordance with aspects of the present disclosure. In the illustrated embodiment, the fifth configuration 150 is established on the engine speed control GUI 60 by the controller in response to operator inputs to the engine speed input device 54 and the CVT mode input device 56. In the illustrated embodiment, the manual mode button 110 of the CVT mode input device 56 is depressed, such that the engine speed operates in the manual mode and the engine speed control GUI 60 presents the letter "M" as the fourth indication 80. While operating in the manual mode, the controller does not utilize input from the RH engine speed lever 104. As such, the controller omits the RH icon from the engine speed control GUI 60. In the illustrated embodiment, the LH engine speed lever 102 controls the engine speed. While in the manual mode, the LH engine speed lever 102 may sets the target engine speed, depicted on the engine speed control GUI 60 as the upper limit 66 (e.g., 2100 RPM). In addition, while in the manual mode, the controller may control the engine speed to achieve the target speed (e.g., of the upper limit 66). In some embodiments, when the engine speed drops below the lower limit 64, the transmission may shift to lower gear ratios (e.g., to bring the engine speed above the lower limit 64). Furthermore, during manual mode the operator may move the LH engine speed lever 102 to enable a smooth transmission engagement, for example, when switching gear ratios. In some embodiments, the lower limit 64 is set by the controller in the fifth configuration 150. In some embodiments, the second indication 68 may present the minimum speed at which the gear ratio lowered to maintain the engine speed above the minimum engine speed.

When the CVT mode input is set to manual mode, as illustrated, only the LH engine speed lever 102 is used and the RH engine speed lever 104 is ignored. The upper limit 66 is set by the LH engine speed input 102, and the lower limit 64 is a fixed value (e.g., either a fixed value or a fixed difference from the upper limit 66 value depending on implementation of the manual mode). In the illustrated embodiment, the manual mode is set by the CVT mode input device 56. In some embodiments, after the engine speed drops below the lower limit 64, the controller causes the transmission to shift to a lower gear. In some embodiments, since the work vehicle is operating in the manual transmission mode, an operator may manually change transmission gears during operation. In some embodiments, an operator may manually control transmission ratio via a ground speed lever. In some embodiments, operating in the manual transmission mode may decouple the engine speed from the speed of the transmission.

FIG. 9 is a schematic diagram of the engine speed control GUI 60 of FIG. 3 in a sixth configuration 160 based on the arrangement of the engine speed input device 54 and the CVT mode input device 56, in accordance with aspects of the present disclosure. In the illustrated embodiment, the sixth configuration 160 is established in response to operator inputs to the engine speed input device 54 and/or the CVT mode input device 56 (e.g., for work vehicles that include a PTO). In the illustrated embodiment, the sixth configuration 160 is established on the engine speed control GUI 60 by the controller in response to operator inputs to the engine speed input device 54 and the CVT mode input device 56. In the illustrated embodiment, the PTO mode button 114 of the CVT mode input device 56 is depressed, such that the engine speed operates in the PTO mode and the engine speed control GUI 60 presents the fourth indication 80. In some embodiments, the CVT mode is set to the PTO mode when the PTO is turned on (e.g., when the PTO mode button 114 is depressed), and the CVT mode returns to the automatic mode when the PTO is turned off (e.g., when the PTO mode button is pressed again). Furthermore, the fifth indication 82 indicates that the units of the numeric values depicted on the engine speed control GUI are in RPM. In the illustrated embodiment, the RH engine speed control is a rotatable knob 105 that may rotate in a direction 162 to set the lower limit 64 (e.g., 1600 RPM). While in the illustrated embodiment, the RH engine speed control is a rotatable knob 105, in some embodiments, the RH engine speed control may be a foot pedal, a lever, a button, a touch screen, etc. Furthermore, in the illustrated embodiment, the RH icon 74 is a circle and the LH icon 72 is a rectangle since the RH engine speed control is a rotatable knob 105 and the LH engine speed control is a lever 102 that can move along the axis 106. However, in further embodiments, the LH and RH icon 72, 74 may be any suitable symbol.

In the illustrated embodiment, the first end 76 of the vertical member 75 of the third indication 70 includes an arrow and the second end 78 omits the arrow, such that the third indication 70 and the fourth indication 80 indicate that the controller is operating in a PTO mode. In some embodiments, when the first end 76 of the vertical member 75 includes an arrow and the second end 78 omits the arrow, the third indication 70 may indicate that the upper limit 66 is the target engine speed and the lower limit 64 is the minimum engine speed. When the LH engine speed lever 102 is positioned further forward or even with the rotatable distance of the rotatable knob 105, the engine speed control GUI 60 presents an arrow on the first end 76 of the vertical member 75 and omits the arrow from the second end 78 of the vertical member 75 of the third indication 70. Accordingly, the third indication 70 indicates that the upper limit 66 (e.g., 1800 RPM) is the target operating engine speed and the lower limit 64 (e.g., 1600 RPM) is the lower allowable engine speed the work vehicle may operate at. When the LH icon 72 is positioned at the top of vertical member 75, the RH icon 74 is presented as a circle, the fourth indication 80 indicates that the controller is operating in the PTO mode. Additionally, when the first end 76 includes the arrow and the second end 78 omits the arrow, as illustrated, the engine speed control GUI 60 conveys the target engine speed (e.g., upper limit 66) specified by the LH engine speed lever 102 and the minimum engine speed (e.g., lower limit 64) specified by the rotatable knob 105. In some embodiments, after the engine speed drops below the lower limit 64, the controller causes the transmission to shift to a lower gear or a lower gear ratio. In some embodiments, the visual feedback of the sixth configuration 160 may be useful for operation where PTO is in use and an engine speed input adjustment is necessary to adapt to change in load or PTO output speed. The operator may receive a visual confirmation, as illustrated, indicating that the work vehicle is being operated accordingly While only certain features of the invention have been illustrated and described herein, many modifications and changes will occur to those skilled in the art. For example, the engine speed input device may be any suitable device configured to receive user inputs. For example, the CVT mode input device may be any suitable device configured to receive user inputs. It is, therefore, to be understood that the appended claims are intended to cover all such modifications and changes as fall within the true spirit of the invention.

The invention claimed is:

1. A control system for a work vehicle system, the control system comprising:
 a controller comprising a memory and a processor, wherein the controller is configured to instruct a graphical user interface to:
  present a first indication having a member extending between a first end and a second end, wherein the second end is positioned above the first end, wherein the first indication comprises a first icon corresponding to a first engine speed input device, a second icon corresponding to a second engine speed input device, or any combination thereof;
  present a second indication indicative of an engine speed range, wherein the second indication comprises a lower engine speed value and an upper engine speed value;
  selectively present a first symbol at the first end of the member and a second symbol at the second end of the member to indicate that an engine speed is configured to vary between the lower engine speed value and the upper engine speed value; and selectively present only the first symbol at the first end of the member to indicate that the upper engine speed value corresponds to a target engine speed.

2. The control system of claim 1, wherein the controller is configured to instruct the graphical user interface to move the first icon along the member based on a first set of user inputs to the first engine speed input device, and move the second icon along the member based on the second set of user inputs to a second engine speed input device.

3. The control system of claim 2, wherein the first end and the second end are adjustable to selectively enlarge and shorten a length of the member based on the second set of user inputs.

4. The control system of claim 1, comprising:
a first engine speed input device configured to output a first signal indicative of a first throttle of the work vehicle based on a first set of user inputs;
a second engine speed input device configured to output a second signal indicative of a second throttle of the work vehicle based on a second set of user inputs; and
a transmission mode input device configured to output a third signal indication of a transmission mode of the work vehicle system based on a third set of user inputs, wherein the presentation of the first indication, the second indication, or any combination thereof, is based on the first, second, and third signals.

5. The control system of claim 1, wherein the controller is configured to instruct the graphical user interface to present a third indication indicative of a minimum engine speed value.

6. The control system of claim 5, wherein the controller is configured to instruct a transmission to transition to a lower gear ratio in response to determining that the engine speed is operating below the minimum engine speed value.

7. The control system of claim 1, wherein the controller is configured to instruct the graphical user interface to present a fourth indication indicative of a current transmission mode of a plurality of transmission modes, wherein the plurality of transmission modes comprises:
an automatic transmission mode;
a manual transmission mode; and
a power take-off (PTO) transmission mode.

8. The control system of claim 1, wherein the first symbol comprises a first arrow pointed downwardly, and the second symbol comprises a second arrow pointed upwardly.

9. The control system of claim 1, wherein the graphical user interface is configured to present a fifth indication indicative of units of the engine speed.

10. A control system for a work vehicle, wherein the control system comprises:
a transmission mode input device configured to receive a transmission mode input indicative of selection of a current transmission mode of a plurality of transmission modes, wherein the plurality of transmission modes comprises an automatic transmission mode, a manual transmission mode, a power-takeoff operation (PTO) transmission mode, or any combination thereof;
an engine speed input device comprising a first engine speed control feature configured to receive a first engine speed input indicative of a first engine speed and a second engine speed control feature configured to receive a second engine speed input indicative of a second engine speed;

a controller communicatively coupled to the transmission mode input device and the engine speed input device, wherein the controller comprises a memory device and a processor, wherein the memory device stores instructions that when executed by the processor are configured to cause the processor to:
receive a first signal indicative of the current transmission mode from the transmission mode input device;
receive a second signal indicative of the first and second engine speeds from the engine speed input device; and
instruct a graphical user interface to:
present a first indication having a member extending between a first end and a second end, wherein the second end is positioned above the first end;
present a second indication indicative of an engine speed range based on the second signal, wherein the second indication comprises a lower engine speed value and an upper engine speed value;
selectively present a first symbol at the first end of the member and a second symbol and the second end of the member, based on the first signal, the second signal, or any combination thereof, to indicate that an engine speed is configured to vary between the lower engine speed value and the upper engine speed value;
selectively present only the first symbol at the first end of the member, based on the first signal, the second signal, or any combination thereof, to indicate that the upper engine speed value corresponds to a target engine speed; and
present a first icon, a second icon, or a combination thereof, along the member of the first indication to indicate the selection of the current transmission mode based on the first signal, the second signal, or any combination thereof.

11. The control system of claim 10, wherein the instructions when executed by the processor are configured to cause the processor to enable receipt of the first and second engine speed inputs and to instruct the graphical user interface to present the first and second icons along the member in response to selection of the automatic transmission mode as the current transmission mode.

12. The control system of claim 10, wherein the instructions when executed by the processor are configured to cause the processor to instruct the graphical user interface to present the first icon above the second icon in response to the first engine speed being higher than the second engine speed and selection of the automatic transmission mode.

13. The control system of claim 10, wherein the instructions when executed by the processor are configured to cause the processor to enable the second engine speed input to set a droop engine speed and to instruct the graphical user interface to present the second icon at the first end, in response to selection of the constant revolutions per minute (CRPM) mode and selection of the automatic transmission mode.

14. The control system of claim 10, wherein the instructions when executed by the processor are configured to cause the processor to instruct the graphical user interface to present the second symbol and the second icon in response to selection of the constant revolutions per minute (CRPM) mode and selection of the automatic transmission mode.

15. The control system of claim 10, wherein the instructions when executed by the processor are configured to cause the processor to omit the second engine speed symbol and instruct the graphical user interface to present the first icon at the second end in response to selection of the manual transmission mode as the current transmission mode.

16. The control system of claim 10, wherein the first engine speed control feature comprises a first lever, the second engine speed control feature comprises a second lever, the first and second levers are configured to independently move along an axis, the first engine speed is based on a position of the first lever, and the second engine speed is based on a position of the second lever.

17. At least one tangible, non-transitory, computer-readable medium that stores instructions executable by a processor, wherein the instructions are configured to cause the processor to instruct a graphical user interface to:
present a first indication having a member extending between a first end and a second end, wherein the second end is positioned above the first end, wherein the first indication comprises a first icon corresponding to a first engine speed input device, a second icon corresponding to a second engine speed input device, or any combination thereof;
present a second indication indicative of an engine speed range, wherein the second indication comprises a lower engine speed value and an upper engine speed value;
selectively present a first symbol at the first end of the first indication and a second symbol and the second end of the first indication to indicate that an engine speed is configured to vary between the lower engine speed value and the upper engine speed value, and
selectively present only the first symbol at the second end of the first indication to indicate the that upper engine speed value corresponds to a target engine speed.

18. The at least one tangible, non-transitory, computer-readable medium of claim 17, wherein the instructions are configured to cause the processor to:
receive a first set of user inputs via an engine speed input device of a work vehicle to control an engine speed of the work vehicle;
receive a second set of user inputs via a transmission mode input device to control a transmission mode; and
control presentation of the first symbol, the second symbol, or any combination thereof, on the member based on the first and second sets of user inputs.

19. The at least one tangible, non-transitory, computer-readable medium of claim 18, wherein the transmission mode comprises an automatic transmission mode, a manual transmission mode, a power-take off (PTO) transmission mode, or any combination thereof.

20. The at least one tangible, non-transitory, computer-readable medium of claim 17, wherein the instructions are configured to cause the processor to instruct the graphical user interface to move the first icon along the member based on a first set of user inputs to the first engine speed input device, and move the second icon along the member based on the second set of user inputs to a second engine speed input device.

* * * * *